United States Patent (10) Patent No.: US 10,391,821 B2
Wakizono                                                                    (45) Date of Patent:      Aug. 27, 2019

(54) PNEUMATIC TIRE

(71) Applicant: SUMITOMO RUBBER INDUSTRIES, LTD., Kobe-shi, Hyogo (JP)

(72) Inventor: Aya Wakizono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 98 days.

(21) Appl. No.: 15/082,558

(22) Filed: Mar. 28, 2016

(65) Prior Publication Data

US 2016/0297255 A1    Oct. 13, 2016

(30) Foreign Application Priority Data

Apr. 9, 2015   (JP) ................................. 2015-079775

(51) Int. Cl.
 *B60C 11/12*    (2006.01)
 *B60C 11/13*    (2006.01)
 *B60C 11/03*    (2006.01)

(52) U.S. Cl.
 CPC ...... *B60C 11/1307* (2013.01); *B60C 11/0302* (2013.01); *B60C 11/0304* (2013.01);
 (Continued)

(58) Field of Classification Search
 CPC ............. B60C 11/1307; B60C 11/1302; B60C 2011/1213; B60C 11/0066;
 (Continued)

(56) References Cited

U.S. PATENT DOCUMENTS

D566,037 S * 4/2008 Raatikainen ................. D12/521
D653,606 S * 2/2012 Raatikainen ................. D12/521
(Continued)

FOREIGN PATENT DOCUMENTS

| EP | 0235072 A2 | 9/1987 |
| EP | 2777951 A1 | 9/2014 |
| JP | 2013-237360 A | 11/2013 |

OTHER PUBLICATIONS

Fullfatrr—http://www.fullfatrr.com/forum/post158476.html (Year: 2012).*

(Continued)

*Primary Examiner* — Robert C Dye
*Assistant Examiner* — Nicholas R Krasnow
(74) *Attorney, Agent, or Firm* — Birch, Stewart, Kolasch & Birch, LLP

(57) ABSTRACT

A pneumatic tire comprises a tread portion provided with tread grooves defining a asymmetrical tread pattern. The tread grooves include an outboard shoulder main groove and an outboard crown main groove extending zigzag continuously in the tire circumferential direction. The outboard shoulder main groove is composed of alternate long groove segments and short groove segments which are inclined with respect to the tire circumferential direction to the outboard tread edge. The inclination angle θb of the short groove segments is larger than The inclination angle θa of the long groove segments. The groove widths of the long groove segments are gradually increased toward the outboard tread edge.

8 Claims, 2 Drawing Sheets

(52) U.S. Cl.
CPC ...... B60C 11/0309 (2013.01); B60C 11/0327 (2013.01); *B60C 11/0306* (2013.01); *B60C 2011/0341* (2013.01); *B60C 2011/0346* (2013.01); *B60C 2011/0353* (2013.01); *B60C 2011/0365* (2013.01); *B60C 2011/0372* (2013.01); *B60C 2011/0376* (2013.01)

(58) Field of Classification Search
CPC ............. B60C 11/0304; B60C 11/1323; B60C 15/0236; B60C 19/001; B60C 2015/0696; B60C 3/06; B60C 9/17; B60C 9/30; B60C 2011/0346
See application file for complete search history.

(56) References Cited

U.S. PATENT DOCUMENTS

| | | | | |
|---|---|---|---|---|
| 9,994,077 | B2* | 6/2018 | Wakizono | B60C 11/0304 |
| 2001/0002603 | A1* | 6/2001 | Ikeda | B60C 11/0318 |
| | | | | 152/209.18 |
| 2010/0116392 | A1* | 5/2010 | Yamakawa | B60C 11/0302 |
| | | | | 152/209.15 |
| 2012/0132334 | A1* | 5/2012 | Nomura | B60C 11/0304 |
| | | | | 152/209.8 |
| 2013/0087261 | A1* | 4/2013 | Kageyama | B60C 11/1218 |
| | | | | 152/209.8 |
| 2013/0292017 | A1* | 11/2013 | Higuchi | B60C 11/0309 |
| | | | | 152/209.3 |
| 2013/0306208 | A1 | 11/2013 | Kageyama | |
| 2014/0014244 | A1 | 1/2014 | Takano | |
| 2014/0238563 | A1* | 8/2014 | Tanaka | B60C 11/0306 |
| | | | | 152/209.2 |
| 2016/0193885 | A1* | 7/2016 | Ogane | B60C 11/0306 |
| | | | | 152/209.18 |
| 2016/0368326 | A1* | 12/2016 | Wakizono | B60C 11/0304 |

OTHER PUBLICATIONS

Nokian WR G2—http://www.fullfatrr.com/forum/post158476.html (Year: 2012).*
Extended European Search Report dated Sep. 15, 2016, for European Application No. 16161301.3.

* cited by examiner

PNEUMATIC TIRE

BACKGROUND OF THE INVENTION

The present invention relates to a pneumatic tire, more particularly to a tread pattern capable of improving on-snow performance.

Heretofore, in order to improve travelling performance of a pneumatic tire on icy and snowy roads, improvements of configurations of tread grooves have been made.

For example, in the Japanese Patent Application Publication No. 2013-237360, the pneumatic tire is provided with a plurality of main grooves and a plurality of lateral grooves in order to improve the traveling performance on icy and snowy roads.

SUMMARY OF THE INVENTION

However, the pneumatic tire disclosed in the above-mentioned Patent Document has room for improvement in the traction performance and handling performance on snowy roads.

It is therefore, an object of the present invention to provide a pneumatic tire, in which the traction performance and handling performance on snowy roads are improved by employing a zigzag main groove composed of two kinds of inclined segments which are inclined with respect to the circumferential direction to one axial direction.

According to the present invention, a pneumatic tire comprises:

a tread portion which is provided with tread grooves defining a tread pattern and which has an outboard tread edge and an inboard tread edge which are intended to be positioned away from the center of a vehicle body and close to the center of the vehicle body, respectively, wherein the tread grooves include an outboard shoulder main groove and an outboard crown main groove which are disposed on the outboard tread edge side of the tire equator and extend zigzag continuously in the tire circumferential direction, the outboard shoulder main groove is composed of alternate long groove segments and short groove segments which are inclined with respect to the tire circumferential direction to the outboard tread edge toward one tire circumferential direction, the long groove segments are inclined at an angle θa with respect to the tire circumferential direction, the short groove segments are inclined at an angle θb with respect to the tire circumferential direction which is larger than the angle θa of the first groove segments, and groove widths of the long groove segments are gradually increased toward the outboard tread edge.

Further, the pneumatic tire according to the present invention may have the following features (1)-(9):

(1) the tread grooves include outboard middle lateral grooves extending from the outboard crown main groove to the outboard shoulder main groove so as to be linearly continued to the respective short groove segments of the outboard shoulder main groove;

(2) groove widths of the outboard middle lateral grooves are gradually increased toward the outboard tread edge;

(3) the outboard crown main groove is composed of alternate first groove segments and second groove segments, wherein the first groove segments are inclined with respect to the tire circumferential direction to the inboard tread edge toward the above-mentioned one tire circumferential direction, and the second groove segment are inclined with respect to the tire circumferential direction to the outboard tread edge toward the above-mentioned one tire circumferential direction, and the outboard middle lateral grooves are connected to the outboard crown main groove so as to be linearly continued to the respective second groove segments of the outboard crown main groove;

(4) the tread grooves include an inboard crown main groove which extends straight continuously in the tire circumferential direction and is disposed adjacently to the outboard crown main groove, and crown lateral grooves extending from the outboard crown main groove to the inboard crown main groove so as to be connected to the respective second groove segments of the outboard crown main groove;

(5) the crown lateral grooves and the outboard middle lateral grooves are inclined with respect to the tire circumferential direction so that, toward the above-mentioned one tire circumferential direction, the crown lateral grooves are inclined to one tire axial direction, and the outboard middle lateral grooves are inclined to the other tire axial direction;

(6) outboard middle blocks, which are divided by the outboard middle lateral grooves, the outboard shoulder main groove and the outboard crown main groove, are each provided with a notch located in a position where an extension of one of the crown lateral grooves intersects with an extension of one of the first groove segments of the outboard crown main groove;

(7) the tread grooves include secondary middle lateral grooves which are disposed one between the two adjacent outboard middle lateral grooves so as to extend from the outboard crown main groove to the outboard shoulder main groove, and groove widths of the secondary middle lateral grooves are gradually increased toward the outboard tread edge;

(8) the tread grooves include outboard shoulder lateral grooves extending from the outboard shoulder main groove towards the outboard tread edge, and the outboard shoulder lateral grooves are linearly continued to the respective secondary middle lateral grooves through the outboard shoulder main groove;

(9) groove widths of the outboard shoulder lateral grooves are gradually increased toward the outboard tread edge.

DESCRIPTION OF THE PREFERRED EMBODIMENTS

Figure 1:
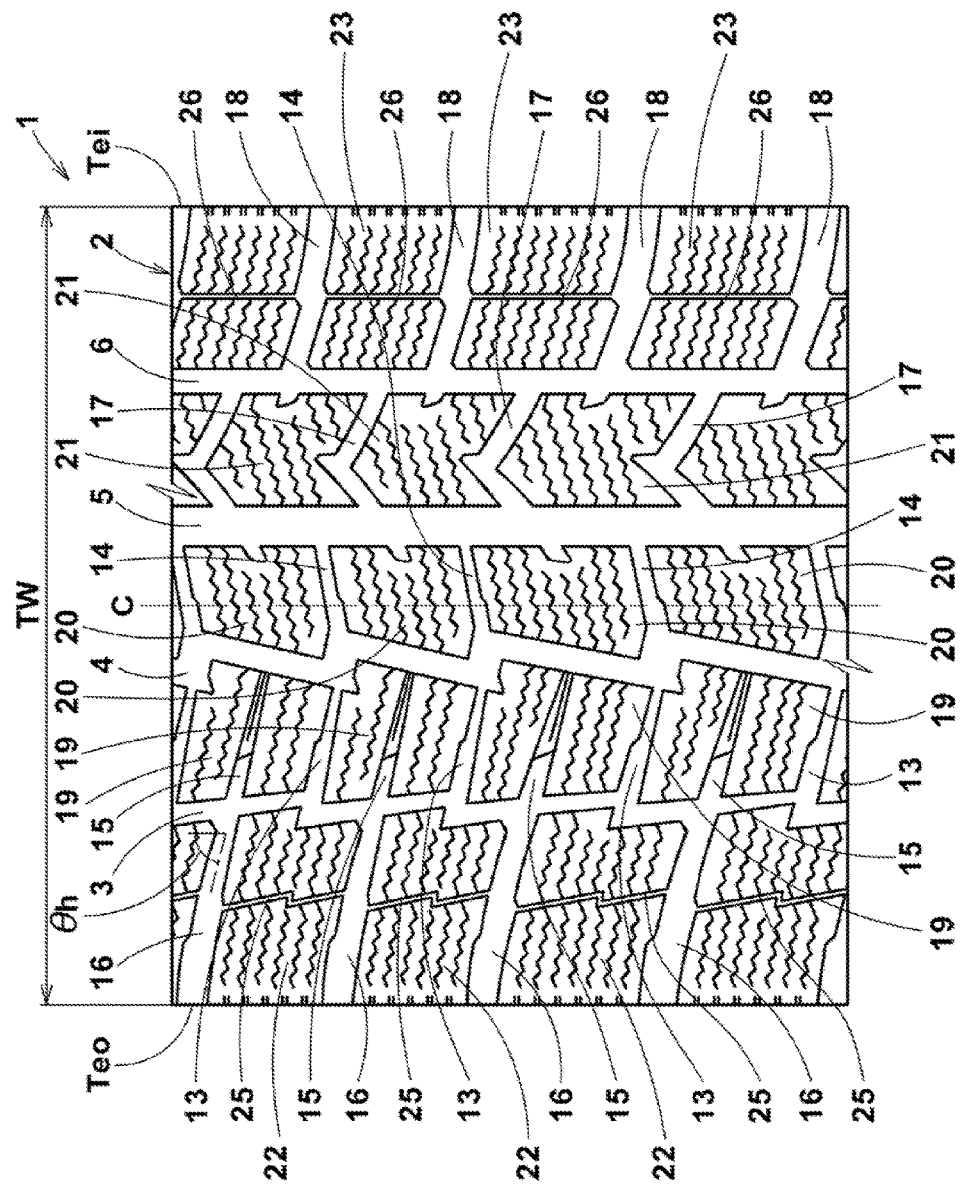
FIG. 1 is a developed partial view of the tread portion of a pneumatic tire as an embodiment of the present invention.

An embodiment of the present invention will now be described in conjunction with accompanying drawings.

The pneumatic tire 1 according to the present invention comprises a tread portion 2, a pair of axially spaced bead portions, a pair of sidewall portions extending between the tread edges and the bead portions, a carcass extending between the bead portions through the tread portion and the sidewall portions, and a tread reinforcing cord layer disposed radially outside the carcass in the tread portion as usual.

The tread portion 2 is provided with a tread pattern of left-right asymmetry (asymmetry about the tire equator) for which the position of the tire relative to a vehicle to which the tire is attached is specified, namely, it is specified which side is inside and which side is outside.

Thus, the tread portion has an outboard tread edge Teo to be positioned away from the center of the vehicle body and an inboard tread edge Tei to be positioned close to the center of the vehicle body.

For example, the sidewall portion to be located on outside when installed on the vehicle is provided with an indication such as "outside", and the sidewall portion to be located on inside is provided with an indication such as "inside".

According thereto, in this application, the terms "outboard" and "inboard" are used toward the outboard tread edge Teo and inboard tread edge Tei, respectively, to refer relative positions in the tire axial direction.

The terms "axially inner", "axially inward" and the like are used toward the tire equator, and the terms "axially outer", "axially outward" and the like are used toward the adjacent tread edge in order to refer relative positions in the tire axial direction.

The tread edges Teo and Tei are the axial outermost edges of the ground contacting patch which occurs under a normally inflated loaded condition when the camber angle of the tire is zero.

The tread width TW is the width measured under a normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

The term "groove width" means the width of a groove measured perpendicularly to the longitudinal direction of the groove.

The present invention is suitably applied to a pneumatic tire for passenger cars. In this embodiment, the pneumatic tire 1 is designed as a passenger car tire.

The tread portion 2 in this embodiment is provided with a plurality of main grooves extending continuously in the tire circumferential direction.

It is preferable that each of the main grooves has a groove width of from 2% to 8% of the tread width TW in order to improve the traction performance and handling performance on snowy roads without sacrificing various performance on dry surface roads.

In this example, as shown in FIG. 1, the main grooves are an outboard shoulder main groove 3, an outboard crown main groove 4, an inboard crown main groove 5 and an inboard shoulder main groove 6 which are arranged in this order from the outboard tread edge Teo to the inboard tread edge Tei.

The outboard crown main groove 4 and the inboard crown main groove 5 are disposed one on each side of the tire equator C.

The outboard shoulder main groove 3 and the inboard shoulder main groove 6 are disposed axially outside the main groove 4 and main groove 5, respectively, as the axially outermost main grooves.

The outboard shoulder main groove 3 is formed as a zigzag groove in order that, in the ground contacting patch, snow compressed into the groove can exert a large shearing force in both of the tire axial direction and the tire circumferential direction, thereby improving the traction performance and handling performance on snowy roads.

Figure 2:
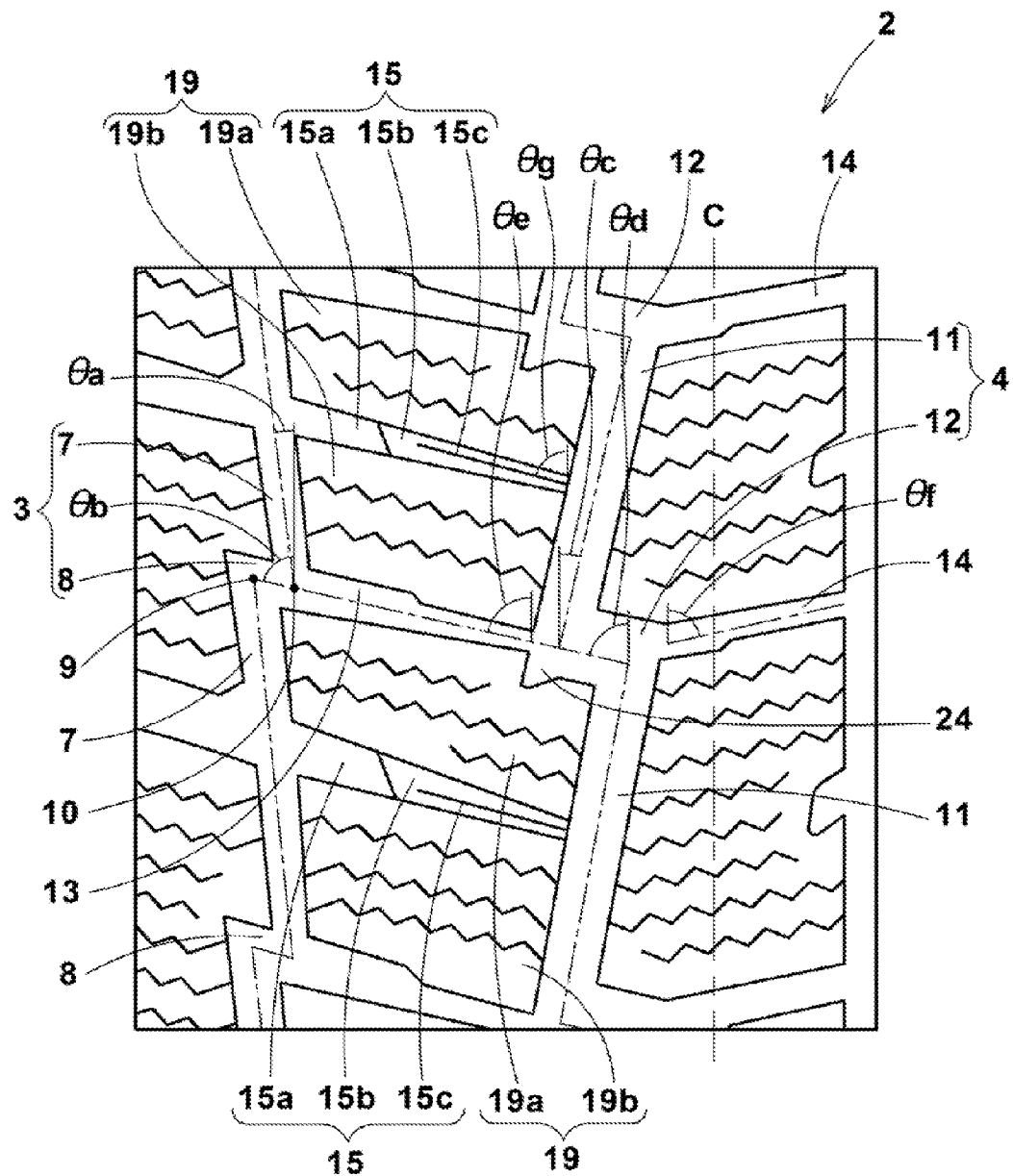
FIG. 2 is a closeup of FIG. 1 showing the outboard shoulder main groove, outboard crown main groove, outboard middle lateral groove, and crown lateral groove.

In this embodiment, as shown in FIG. 2, the outboard shoulder main groove 3 is composed of long groove segments 7 and short groove segments 8 which are arranged alternately in the tire circumferential direction.

The long groove segments 7 have a length, and the short groove segments 8 have a length which is shorter than the length of the long groove segments 7.

The long groove segments 7 are inclined with respect to the tire circumferential direction to the outboard tread edge Teo toward one tire circumferential direction (in the drawings, the upper direction).

Preferably, the inclination angle θa of the long groove segments 7 with respect to the tire circumferential direction is set in a range of from 5 to 15 degrees.

The short groove segments 8 are inclined with respect to the tire circumferential direction to the same direction as the long groove segments 7, namely, to the outboard tread edge Teo toward the above-mentioned one tire circumferential direction.

The inclination angle θb of the short groove segments 8 with respect to the tire circumferential direction is more than the angle θa, and preferably set in a range of from 65 to 85 degrees.

The groove width of the long groove segment 7 is gradually increased toward the outboard tread edge Teo.

Preferably, the groove width of the short groove segment 8 is gradually increased toward the outboard tread edge Teo.

As shown in FIG. 2, the long groove segments 7 and the short groove segments 8 intersect at an acute angle (equivalent to θb−θa) at their axially outer intersecting points 9 (outboard tread edge Teo side) and axially inner intersecting points 10 (tire equator c side). Therefore, in the intersection points 9 and 10, the snow in the groove is tightly compacted, and its shearing force is increased thereby improving the traction performance and handling performance on snowy roads.

Further, in the axially outer intersecting point 9, the groove widths of the long groove segment 7 and the short groove segment 8 become largest, therefore, the compacted snow becomes larger, and the shearing force is increased. Furthermore, the snow ejection from the groove is expedited.

As shown in FIG. 1, the outboard crown main groove 4 is a zigzag groove in order that, in the ground contacting patch, snow compressed into the groove can exert a large shearing force in both of the tire axial direction and the tire circumferential direction, thereby improving the traction performance and handling performance on snowy roads.

In this embodiment, as shown in FIG. 2, the outboard crown main groove 4 is composed of first groove segments 11 and second groove segments 12 which are arranged alternately in the tire circumferential direction.

The first groove segments 11 have a length, and the second groove segments 12 have a length shorter than the length of the first groove segments 11.

The first groove segments 11 are preferably inclined with respect to the tire circumferential direction to the opposite direction to the long groove segments 7, namely, to the inboard tread edge Tei toward the above-mentioned one tire circumferential direction.
The inclination angle θc of the first groove segments 11 with respect to the tire circumferential direction is preferably set in a range of from 5 to 20 degrees.

The second groove segments 12 are preferably inclined with respect to the tire circumferential direction to the opposite direction to the first groove segments 11, namely, to the outboard tread edge Teo toward the above-mentioned one tire circumferential direction.

Thus, the second groove segments 12 are inclined to the same direction as the long groove segments 7 and the short groove segments 8 of the outboard shoulder main groove 3.

The inclination angle θd of the second groove segments 12 with respect to the tire circumferential direction is preferably set in a range of from 65 to 85 degrees.

Preferably, the first groove segments 11 have a constant groove width, and the second groove segments 12 have a constant groove width more than the groove width of the first groove segments 11.

The pneumatic tire 1 having such outboard shoulder main groove 3 and outboard crown main groove 4 can exhibit excellent traction performance and handling performance on snowy roads in both rotational directions of the tire since the function of the inclined groove segments of the outboard shoulder main groove 3 can complement the function of the inclined groove segments of the outboard crown main groove 4 in either tire rotational direction.

As shown in FIG. 1, the inboard crown main groove 5 is disposed on the inside tread edge Tei side of the tire equator c, and adjacently to the outboard crown main groove 4.
The inboard shoulder main groove 6 is disposed on the inboard tread end Tei side of the inboard crown main groove 5, and adjacently to the inboard crown main groove 5.
The inboard shoulder main groove 6 is the axially outermost main groove on the inboard tread edge Tei side.

The inboard crown main groove 5 in this embodiment is a straight groove having a constant groove width in order that snow ejection from the groove is expedited, and thereby, the handling performance on snowy roads can be improved.

The inboard shoulder main groove 6 in this embodiment is a straight groove having a constant groove width in order that snow ejection from the groove is expedited, and thereby, the handling performance on snowy roads can be improved.

It is desirable that the groove width of the inboard crown main groove 5 is more than the groove width of the inboard shoulder main groove 6.

In this embodiment, the tread portion 2 is further provided with axially extending lateral grooves.

In order to improve the handling performance on snowy roads without sacrificing various performance on dry surface roads, it is preferred that the lateral grooves each have a groove width of from 1.5% to 7% of the tread width TW.

In this embodiment, as shown in FIG. 1, the lateral grooves are outboard middle lateral grooves 13, crown lateral grooves 14, secondary outboard middle lateral grooves 15, outboard shoulder lateral grooves 16, inboard middle lateral grooves 17, and inboard shoulder lateral grooves 18.

As shown in FIG. 2, the outboard middle lateral grooves 13 extend from the outboard crown main groove 4 to the outboard shoulder main groove 3.
Each of the outboard middle lateral grooves 13 in this embodiment extends substantially straight.
Preferably, the outboard middle lateral grooves 13 are inclined with respect to the tire circumferential direction to the same direction as the long groove segments 7 toward the above-mentioned one tire circumferential direction at an angle θe.
The inclination angle θe of the outboard middle lateral grooves 13 is preferably set in a range of from 65 to 85 degrees with respect to the tire circumferential direction.

It is preferable that the groove width of each of the outboard middle lateral grooves 13 is gradually increased toward the outboard tread edge Teo in order that, on the outboard tread edge Teo side, the shearing force of compacted snow becomes larger, and snow ejection is expedited.

In this embodiment, the outboard middle lateral grooves 13 are connected to the outboard shoulder main groove 3 at the axially inner intersecting points 10 so that the outboard middle lateral grooves 13 are linearly continued to the respective short groove segments 8 of the outboard shoulder main groove 3.

Further, the outboard middle lateral grooves 13 are connected to the outboard crown main groove 4 so that the outboard middle lateral grooves 13 are linearly continued to the respective second groove segments 12 of the outboard crown main groove 4.

It is preferred that the angle θb of the short groove segments 8 of the outboard shoulder main groove 3, the angle θd of the second groove segments 12 of the outboard crown main groove 4, and the angle θe of the outboard middle lateral grooves 13 are substantially same in order that the short groove segment 8, the outboard middle lateral groove 13 and the second groove segment 12 are arranged in line to function as one continuous groove, and thereby to form strong compressed snow capable of improving the traction performance and handling performance on snowy roads.

The above-mentioned crown lateral grooves 14 extend between the outboard crown main groove 4 and the inboard crown main groove 5.
In this embodiment, the crown lateral grooves 14 extend substantially straight.
It is preferable that the crown lateral grooves 14 are inclined with respect to the tire circumferential direction to the opposite direction to the outboard middle lateral grooves 13 toward the above-mentioned one tire circumferential direction at an angle θf.
The inclination angle θf of the crown lateral grooves 14 is preferably set in a range of from 70 to 85 degrees with respect to the tire circumferential direction.
The crown lateral grooves 14 are connected to the respective second groove segments 12 of the outboard crown main groove 4 at a predetermined intersecting angle.

The above-mentioned secondary middle lateral grooves 15 extend from the outboard crown main groove 4 to the outboard shoulder main groove 3.

The secondary middle lateral grooves 15 are arranged one between every two of the circumferentially adjacent outboard middle lateral grooves 13, and extend substantially straight in this embodiment.
In other words, the secondary middle lateral grooves 15 and outboard middle lateral grooves 13 are arranged alternately in the tire circumferential direction.

Preferably, the secondary middle lateral grooves 15 are inclined with respect to the tire circumferential direction to the same direction as the outboard middle lateral grooves 13 toward the above-mentioned one tire circumferential direction at an angle θg.
The inclination angle θg of the secondary middle lateral grooves 15 is preferably set in a range of from 65 to 85 degrees with respect to the tire circumferential direction.
It is preferable that the groove width of each of the secondary middle lateral grooves 15 is gradually increased toward the outboard tread edge Teo.

It is preferable that, as shown in FIG. 2, each of the secondary middle lateral grooves 15 comprises a deep portion 15a and a shallow portion 15b.
The shallow portion 15b is disposed axially inside the deep portion 15a.
Preferably, the shallow portion 15b is provided in the groove bottom with a shallow ripe 15c.

The above-mentioned outboard shoulder lateral grooves 16 extend from the outboard shoulder main groove 3 to the outboard tread edge Teo as shown in FIG. 1.
In this embodiment, the outboard shoulder lateral grooves 16 extend substantially straight.
Preferably, the outboard shoulder lateral grooves 16 are inclined with respect to the tire circumferential direction to the same direction as the outboard middle lateral grooves 13 toward the above-mentioned one tire circumferential direction at an angle θh.
The inclination angle θh of the outboard shoulder lateral grooves 16 is preferably set in a range of from 65 to 85 degrees.
It is preferable that the groove width of each of the outboard shoulder lateral grooves 16 is gradually increased toward the outboard tread edge Teo.
The outboard shoulder lateral grooves 16 are linearly continued to the respective secondary middle lateral grooves 15 through the outboard shoulder main groove 3.

It is preferable that the angle θe of the outboard middle lateral grooves 13, the angle θg of the secondary middle lateral grooves 15, the angle θh of the outboard shoulder lateral grooves 16 are substantially same in order to improve the snow ejection from these lateral grooves.

The above-mentioned inboard middle lateral grooves 17 extend from the inboard crown main groove 5 to the inboard shoulder main groove 6.
The inboard middle lateral grooves 17 are connected to the inboard crown main groove 5 at circumferential positions between the respective circumferential positions at which the crown lateral grooves 14 are connected to the inboard crown main groove 5.
In this embodiment, each of the inboard middle lateral grooves 17 is bent in a substantially V shape in order to form strong compressed snow capable of improving the traction performance and handling performance on snowy roads.

The above-mentioned inboard shoulder lateral grooves 18 extend from the inboard shoulder main groove 6 to the inboard tread edge Tei.

The inboard shoulder lateral grooves 18 are connected to the inboard shoulder main groove 6 at circumferential positions between the respective circumferential positions at which the inboard middle lateral grooves 17 are connected to the inboard shoulder main groove 6.
In this embodiment, the inboard shoulder lateral grooves 18 are zigzag grooves in order that compressed snow can exert large shearing force in both of the tire axial direction and the tire circumferential direction.

Therefore, by the above-mentioned main grooves and lateral grooves, the tread portion 2 in this embodiment is divided into a large number of blocks.
Preferably, such blocks are each provided with a plurality of sipes in order to improve on-ice performance and on-snow performance by their edge effect.

In this embodiment, the blocks are outboard middle blocks 19, crown blocks 20, inboard middle blocks 21, outboard shoulder blocks 22 and inboard shoulder blocks 23.

The outboard middle blocks 19 are formed between the outboard shoulder main groove 3 and the outboard crown main groove 4 and circumferentially divided by the outboard middle lateral grooves 13.

The crown blocks 20 are formed between the outboard crown main groove 4 and the inboard crown main groove 5 and circumferentially divided by the crown lateral grooves 14.

The inboard middle blocks 21 are formed between the inboard crown main groove 5 and the inboard shoulder main groove 6 and circumferentially divided by the inboard middle lateral grooves 17.

The outboard shoulder blocks 22 are formed between the outboard shoulder main groove 3 and the outboard tread edge Teo and circumferentially divided by the outboard shoulder lateral grooves 16.

The inboard shoulder blocks 23 are formed between the inboard shoulder main groove 6 and inside the tread end Tei and circumferentially divided by the inboard shoulder lateral grooves 18.

It is preferable that, as shown in FIG. 2, each of the outboard middle blocks 19 is subdivided in the tire circumferential direction by one of the secondary middle lateral grooves 15 into a block piece 19a having a longer tire axial length and a block piece 19b having a shorter axial length.

The block piece 19a is preferably provided with a notch 24 in a portion at which an extension of the crown lateral groove 14 intersects with an extension of the first groove segment 11 of the outboard crown main groove 4.

The notch 24 has two edges between which an acute angle is formed.
one of the two edges of the notch 24 is in line with the axially outer edge of the first groove segment 11, and the other edge is in line with one of the edges of the crown lateral groove 14.

In cooperation with the adjacent first groove segment 11 and crown lateral groove 14, such notch 24 can form strong compressed snow capable of improving the traction performance and handling performance on snowy roads.

It is preferable that, as shown in FIG. 1, each of the outboard shoulder blocks 22 is provided with an outboard shoulder narrow groove 25 extending in the tire circumferential direction from one of the two adjacent outboard shoulder lateral grooves 16 to the other in order to improve on-ice performance and on-snow performance by its edge effect.

The outboard shoulder narrow groove 25 in this example extends zigzag.

It is preferable that, as shown in FIG. 1, each of the inboard shoulder blocks 23 is provided with an inboard shoulder narrow groove 26 extending in the tire circumferential direction from one of the two adjacent inboard shoulder lateral grooves 18 to the other in order to improve on-ice performance and on-snow performance by its edge effect. The inboard shoulder narrow groove 26 in this example extends straight.

while detailed description has been made of an especially preferable embodiment of the present invention, the present invention can be embodied in various forms without being limited to the illustrated embodiment Comparison Tests Based on the tread pattern shown in FIG. 1, pneumatic tires of size 205/55R16 for passenger cars were experimentally manufactured and tested for handling performance and traction performance on snowy roads.
The specifications of the test tires are listed in Table 1. Test methods are as follows.

<Traction Performance Test>

The test tires were attached to all wheels of a test car. (tire pressure 220 kPa) The test car was run on a straight test course covered with trodden snow, and the test driver evaluated the traction performance of the test tire base on response when accelerating and decelerating, and road grip in the front-back direction.
The results are indicated in Table 1 by an index based on Comparative example 1 being 100, wherein the larger the value, the better the traction performance on snowy roads.

<Handling Performance Test>

The above-mentioned test car was run on a circuit test course covered with trodden snow, and the test driver evaluated the handling performance of the test tire based on steering response, road grip in the lateral direction.
The results are indicated in Table 1 by an index based on comparative example 1 being 100, wherein the larger the value, the better the handling performance on snowy roads.

TABLE 1

| tire | Comparative Example 1 | Comparative Example 2 | Working Example 1 | Working Example 2 | Working Example 3 |
|---|---|---|---|---|---|
| Outboard shoulder main groove | straight | zigzag | zigzag | zigzag | zigzag |
| Groove width of longer first groove segments 11 | constant | constant | gradual increase | gradual increase | gradual increase |
| Groove width of first lateral grooves 13 | constant | constant | constant | gradual increase | gradual increase |
| Notch | none | none | none | none | exist |
| Traction performance | 100 | 105 | 109 | 112 | 116 |
| Handling performance | 100 | 104 | 109 | 112 | 115 |

From the test results, it was confirmed that, in comparison with the comparative example tires, working example tires were significantly improved in the traction performance and handling performance on snowy roads to have good on-snow performance.

DESCRIPTION OF THE SIGNS 2 tread portion
3 outboard shoulder main groove
4 outboard crown main groove
5 inboard crown main groove
6 inboard shoulder main groove
7 long groove segment of outboard crown main groove
8 short groove segment of outboard crown main groove
11 first groove segment of outboard shoulder main groove
12 second groove segment of outboard shoulder main groove
13 outboard middle lateral groove
14 crown lateral groove
15 secondary outboard middle lateral groove
16 outboard shoulder lateral groove
19 outboard middle block
24 notch
Teo outboard tread edge
Tei inboard tread edge
C tire equator

The invention claimed is:

1. A pneumatic tire comprising:
a tread portion which is provided with tread grooves defining a tread pattern and which has an outboard tread edge and an inboard tread edge which are intended to be positioned away from the center of a vehicle body and close to the center of the vehicle body, respectively,
wherein the tread grooves include an outboard shoulder main groove and an outboard crown main groove which are disposed on the outboard tread edge side of the tire equator and extend zigzag continuously in the tire circumferential direction,
wherein the outboard shoulder main groove is composed of alternate long groove segments and short groove segments which are inclined with respect to the tire circumferential direction to the outboard tread edge toward one side in the tire circumferential direction,
wherein the long groove segments are inclined at an angle θa with respect to the tire circumferential direction,
wherein the short groove segments are inclined at an angle θb with respect to the tire circumferential direction which is larger than the angle θa of the first groove segments,
wherein groove widths of the long groove segments gradually increase toward the outboard tread edge,
wherein the outboard crown main groove is composed of alternate first groove segments and second groove segments, wherein the first groove segments are inclined with respect to the tire circumferential direction to the inboard tread edge toward one side in the tire circumferential direction,
wherein the second groove segments are inclined with respect to the tire circumferential direction to the outboard tread edge toward one side in the tire circumferential direction,
wherein the tread grooves include outboard middle lateral grooves extending from the outboard crown main groove to the outboard shoulder main groove so as to be linearly continued to the respective short groove segments of the outboard shoulder main groove, wherein the tread grooves include secondary middle lateral grooves which are alternated with the outboard middle lateral grooves so as to not be linearly continued with the short groove segments of the outboard shoulder main groove and extend from the outboard crown main groove to the outboard shoulder main groove, wherein groove widths of the secondary middle lateral grooves gradually increase toward the outboard tread edge, wherein the tread grooves include outboard shoulder lateral grooves extending from the outboard shoulder main groove towards the outboard tread edge, and wherein the outboard shoulder lateral grooves are linearly continued to the respective secondary middle lateral grooves through the outboard shoulder main groove.

2. The pneumatic tire according to claim 1, wherein groove widths of the outboard middle lateral grooves are gradually increased toward the outboard tread edge.

3. The pneumatic tire according to claim 1, wherein the outboard middle lateral grooves are connected to the outboard crown main groove so as to be linearly continued to the respective second groove segments of the outboard crown main groove.

4. The pneumatic tire according to claim 3, wherein the tread grooves include an inboard crown main groove which extends straight continuously in the tire circumferential direction and is disposed adjacently to the outboard crown main groove, and crown lateral grooves extending from the outboard crown main groove to the inboard crown main groove so as to be connected to the respective second groove segments of the outboard crown main groove.

5. The pneumatic tire according to claim 4, wherein the crown lateral grooves and the outboard middle lateral grooves are inclined with respect to the tire circumferential direction so that, toward the above-mentioned one side in the tire circumferential direction, the crown lateral grooves are inclined to one side in the tire axial direction, and the outboard middle lateral grooves are inclined to the other side in the tire axial direction.

6. The pneumatic tire according to claim 4, wherein outboard middle blocks, which are divided by the outboard middle lateral grooves, the outboard shoulder main groove and the outboard crown main groove, are each provided with a notch located in a position where an extension of one of the crown lateral grooves intersects with an extension of one of the first groove segments of the outboard crown main groove.

7. The pneumatic tire of claim 1, wherein groove widths of the outboard shoulder lateral grooves gradually increase toward the outboard tread edge.

8. The pneumatic tire of claim 7, wherein in each of the secondary middle lateral grooves and one of the outboard shoulder lateral grooves which is linearly continued thereto, the groove widths thereof gradually increase from the outboard crown main groove to the outboard tread edge.

* * * * *